(12) United States Patent
Howard et al.

(10) Patent No.: US 6,506,973 B1
(45) Date of Patent: Jan. 14, 2003

(54) ADJUSTABLE POWER POLE

(75) Inventors: Carol A. Howard, Oxford, CT (US);
David L. Lutz, Woodbridge, CT (US);
Lawrence Turner, Seymour, CT (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/942,965

(22) Filed: Aug. 31, 2001

(51) Int. Cl.$^7$ ................................................ H02G 3/04
(52) U.S. Cl. ............................ 174/48; 174/50; 174/49; 220/3.2; 220/4.02
(58) Field of Search .............................. 174/48, 49, 50, 174/53, 54, 57, 58, 59, 60, 64, 135, 68.1, 45 R; 220/3.2, 3.8, 3.3, 3.7, 4.01, 4.02; 248/218.4, 219.1, 219.2

(56) References Cited

U.S. PATENT DOCUMENTS

| | | | | |
|---|---|---|---|---|
| 2,841,634 A | * | 7/1958 | Kimball | ..................... 174/45 R |
| 3,265,416 A | | 8/1966 | Downes | |
| 3,492,766 A | * | 2/1970 | Andrews | ..................... 52/243.1 |
| 3,814,833 A | | 6/1974 | Yamada et al. | |
| 3,868,474 A | * | 2/1975 | Bunten | ......................... 174/60 |
| 4,015,397 A | | 4/1977 | Flachbarth et al. | |
| 4,164,618 A | | 8/1979 | Casasanta | |
| 4,178,468 A | | 12/1979 | Jorgensen et al. | |
| 4,218,579 A | | 8/1980 | Joly | |
| 4,252,989 A | | 2/1981 | Blumenthal | |
| 4,353,411 A | * | 10/1982 | Harter et al. | .............. 165/48 R |
| 4,373,111 A | | 2/1983 | Myers et al. | |
| 4,577,055 A | * | 3/1986 | Wuertz | .......................... 174/48 |
| 4,684,097 A | * | 8/1987 | Cox | ......................... 248/354.3 |
| 4,812,958 A | * | 3/1989 | Rolfe et al. | ................ 174/45 R |
| 4,902,852 A | | 2/1990 | Wuertz | |
| 5,040,345 A | | 8/1991 | Gilmour | |
| 5,175,971 A | * | 1/1993 | McCombs | .................... 52/697 |
| 5,186,430 A | | 2/1993 | Ellithorpe | |
| 5,685,113 A | | 11/1997 | Reuter et al. | |
| 5,784,841 A | | 7/1998 | Nowell | |
| 5,986,576 A | * | 11/1999 | Armstrong | ................ 116/63 P |
| 6,116,556 A | * | 9/2000 | Roth | ........................ 248/200.1 |
| 6,119,430 A | | 9/2000 | Nicholls | |
| 6,151,860 A | * | 11/2000 | Reisdorff | ....................... 52/170 |
| 6,343,568 B1 | * | 2/2002 | McClasky | .................... 119/428 |
| 6,364,678 B1 | * | 4/2002 | Hellwig et al. | .............. 439/207 |

OTHER PUBLICATIONS

The Wiremold Company, Wire Management Systems, Tele–Power Poles, *Bring Wiring Down to Business*; pps. 1–8; 2000.

* cited by examiner

*Primary Examiner*—Dean A. Reichard
*Assistant Examiner*—Angel R. Estrada
(74) *Attorney, Agent, or Firm*—Alfred N. Goodman; Mark S. Bicks; Tara L. Hoffman

(57) ABSTRACT

A pole for supplying power and communications including an elongated body that slidably receives an adjustment member. The pole body has an inner compartment receiving power and communications wiring therein and a barrier member defining first and second channels within the inner compartment. The adjustment member is received in the inner compartment of the elongated body, and defines a longitudinal axis substantially parallel to the longitudinal axis of the elongated body. Also, the adjustment member has a first securing interface corresponding to a securing element of pole body when the adjustment member is in a first position with respect to the elongated body.

35 Claims, 6 Drawing Sheets

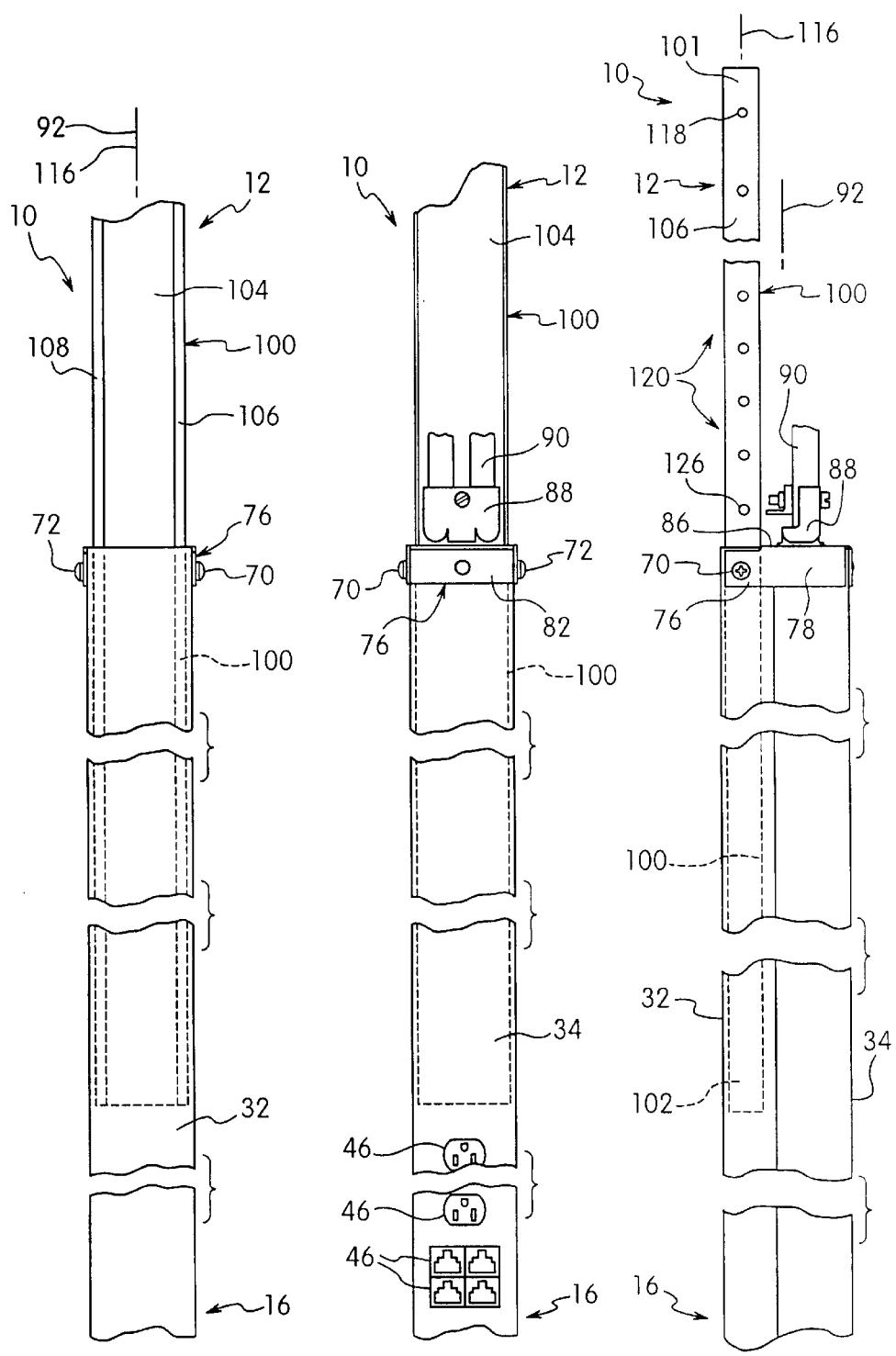

ADJUSTABLE POWER POLE

FIELD OF THE INVENTION

The present invention generally relates to an adjustable power pole that provides a convenient location for power and communication outlets in large areas. More specifically, the invention relates to a power pole including an adjustable member telescopically coupled to the pole that allows the pole to adjust to any ceiling height of a large area.

BACKGROUND OF THE INVENTION

Conventional power poles provide both electrical power and communication service to large interior areas. In particular, power poles bring power or communication lines from a source located above a false ceiling to a convenient level at which the power and communication outlets are needed, typically near a floor or adjacent a checkout register or desk. A clamping device and a foot anchor are used to support the power pole between the ceiling and floor.

Conventional power poles are typically divided into two compartments by a longitudinally extending interior wall with the electrical power connections fed through one compartment and communication wiring fed through the other compartment. The wiring supported by the two compartments of the pole are typically connected above the ceiling to a junction box, telephone or computer system.

However, the conventional power poles can be difficult to install if the power pole does not have the exact or appropriate length to match the height of the ceiling. Specifically, conventional power poles fail to provide a mechanism for adjusting the length or height of the power pole to a variety of ceiling heights.

Examples of conventional power poles are disclosed in U.S. Pat. Nos. 3,265,416 to Downes; U.S. Pat. No. 3,492,766 to Andrews; U.S. Pat. No. 4,015,397 to Flachbarth et al.; U.S. Pat. No. 4,164,618 to Casasanta; U.S. Pat. No. 4,218,579 to Joly; U.S. Pat. No. 4,252,989 to Blumenthal; U.S. Pat. No. 4,373,111 to Myers et al.; U.S. Pat. No. 4,902,852 to Wuertz; and U.S. Pat. No. 6,119,430 to Nicholls.

SUMMARY OF THE INVENTION

Accordingly, an object of the present invention is to provide an adjustable power pole for supplying power and communication wiring to a convenient location.

Another object of the present invention is to provide an adjustable power pole that adjusts to any ceiling height.

Yet another object of the present invention is to provide an adjustable power pole that includes an unitary adjustable member that maintains the separation between the power and communication wiring mandated under UL requirements.

The foregoing objects are basically attained by a pole for supplying power and communications including an elongated body having a wall, the wall defines an inner compartment receiving power and communications wiring therein, and having a securing element, and a longitudinal axis; a barrier member is supported by the elongated body, and the barrier member defined first and second channels within the inner compartment, the first and second channels receiving the power and communications wiring; and an adjustment member is slidably received in the inner compartment of the elongated body, the adjustment member defines a longitudinal axis, the longitudinal axis of the adjustment member is substantially parallel to the longitudinal axis of the wall of the elongated body, and the adjustment member having a first securing interface corresponding to the securing element of the wall of the elongated body when the adjustment member is in a first position with respect to the elongated body.

The foregoing objects are also basically attained by a pole for supplying power and communications, including a wall, the wall defines a first inner compartment receiving power and communications wiring, a securing element is located on the wall, and a first barrier member defines first and second channels within the first inner compartment and the first and second channels receive the power and communications wiring; and an adjustment member is slidably received in the first inner compartment of the elongated body, and has a main wall and an end wall forming a second inner compartment, the second compartment being substantially co-axial with the first compartment of the elongated body, and a first securing interface corresponds to the securing element of the wall of the elongated body when the adjustment member is in a first position with respect to the elongated body.

The foregoing objects are also attained by a pole for supplying power and communications that includes an elongated body that has a wall, the wall defines an inner compartment that receives power and communications wiring therein, and the wall has a securing element, and a longitudinal axis; a barrier member is supported by the elongated body, the barrier member defines first and second channels within the inner compartment the first and second channels receiving the power and communications wiring; and an adjustment member is slidably coupled with the elongated body, the adjustment member defines a longitudinal axis, the longitudinal axis of the adjustment member is substantially parallel to the longitudinal axis of the wall of the elongated body, and the adjustment member has a first securing interface corresponding to the securing element of the wall of the elongated body when the adjustment member is in a first position with respect to the elongated body.

By fashioning the pole in this manner, the pole can be adjusted to any ceiling height by moving the adjustment member with respect to the pole body.

Other objects, advantages and salient features of the invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 2 is a front elevational view of the adjustable power pole illustrated in FIG. 1;

FIG. 3 is a rear elevational view of the adjustable pole illustrated in FIG. 1;

FIG. 4 is a side elevational view of the adjustable pole illustrated in FIG. 1;

DETAILED DESCRIPTION OF THE INVENTION

Figure 1:
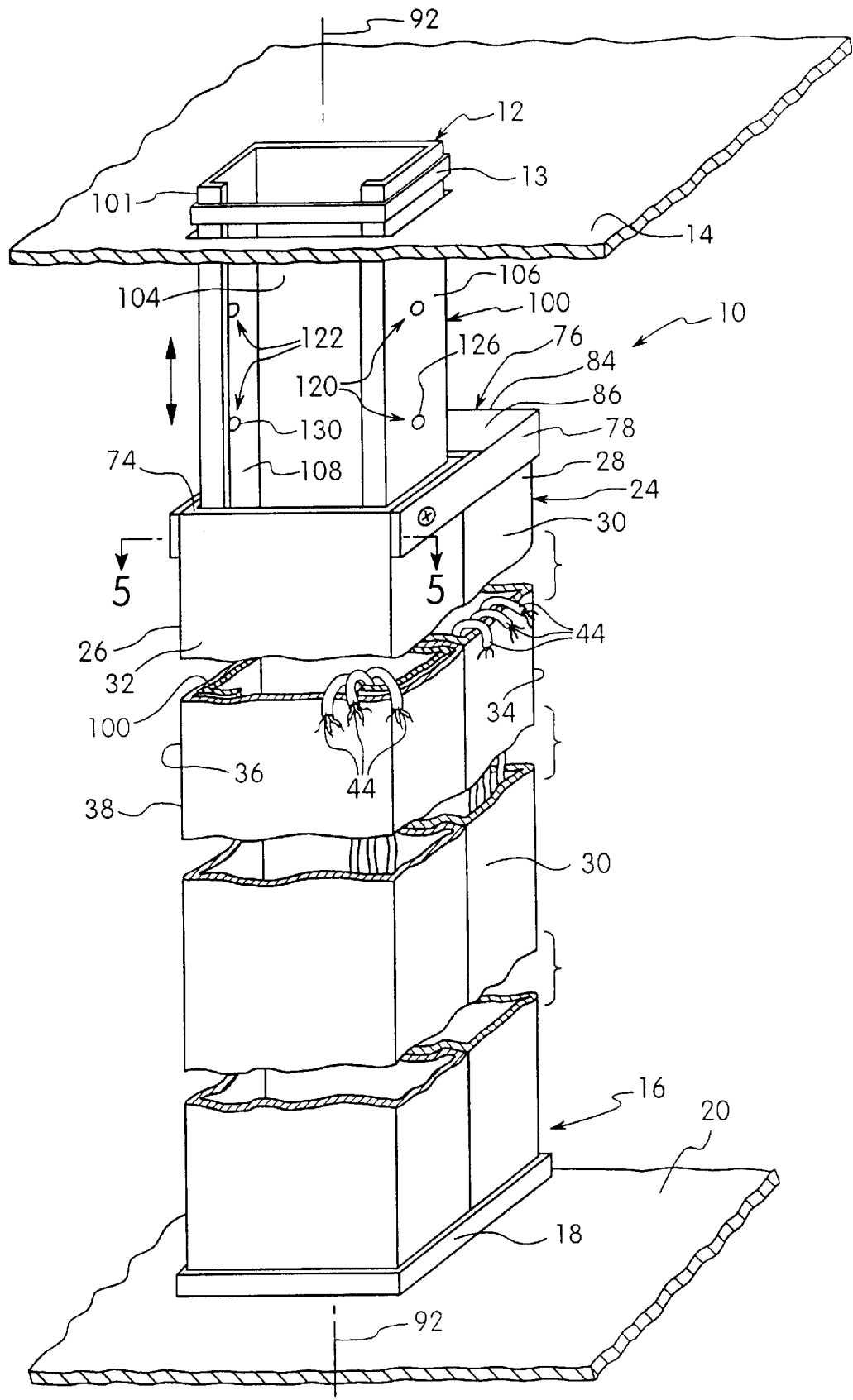
FIG. 1 is an enlarged, perspective view of an adjustable power pole in accordance with a first embodiment of the present invention, showing the adjustable pole mounted between two surfaces.

Referring to FIGS. 1–5, an adjustable power pole 10 in accordance with the present invention provides power and communication wiring or conductors from the ceiling of a building to an area below the ceiling, such as a desk or check-out register. An upper end 12 of pole 10 is supported by a clamping mechanism 13 above a ceiling 14 and anchoring the lower end 16 via a foot 18 to a floor 20, as is well known in the art. A slidable adjustment member 100 is slidably coupled with an elongated body 24 of pole 10 that allows the height of pole 10 to adjust to different heights of various ceilings. The term height refers to the longitudinal dimension of pole 10, which can also be the length or width of pole 10.

As seen in FIGS. 1–5, pole 10 includes an elongated body 24 formed by engagement of a base and a cover 26 and 28 thereby defining first, second, third, and fourth walls 30, 32, 34, and 36. Elongated body 24 is preferably formed of aluminum or steel to meet UL requirements, but can be formed of any substantially rigid material, such as plastic. First and fourth walls 30 and 36 are side walls, second wall 32 is a front wall, and third wall 34 is a rear wall. The designation of front, rear, or side facilitates description of the invention only and therefore any of the walls 30, 32, 34, and 36 can be a front, rear, or side wall. Pole body 24 has an outer surface 38 and an inner surface 40 that defines an inner compartment 42 extending throughout the length of elongated body 24. Preferably, pole body 24 is about 22 feet in length, but can be any desired length.

Inner compartment 42 receives wiring 44 for providing power and communications to pole 10. In particular, outlet receptacles 46 are provided on rear wall 34 as seen in FIG. 3 and are connected to wiring 44. Wiring 44 includes any power or communication wiring such as for power, data, video, or voice applications transmitted as light or electrical energy in fiber optic cables or electrical wires. Outlet receptacles 46 refer to any receptacles that connect to wiring 44 and provide a connection mechanism to wiring 44, such as electrical outlets, or computer telephone/cable jacks or ports. Outlets 46 are disposed closer to pole lower end 16 than its upper end 12, as seen in FIG. 2, to provide easy access to the outlets 46 once pole 10 is mounted between ceiling surface 14 and floor surface 20.

Figure 5:
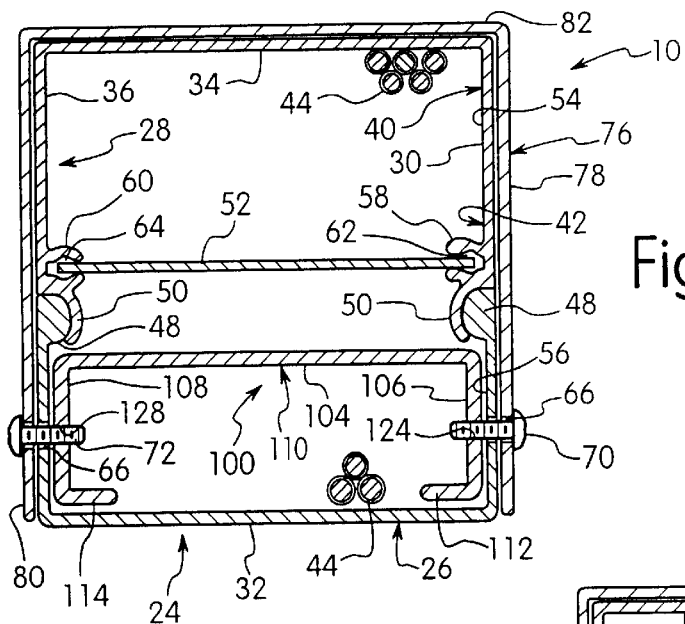
FIG. 5 is an enlarged, top plan view in section of the adjustable power pole taken along line 5—5 of FIG. 1.

Base 26 and cover 28 form a generally rectangular shaped elongated body 24 in cross-section. Body 24, however, can be any polygonal shape such as square or trapezoidal, and any circular shape as long as wiring 44 and adjustment insert 100 are accommodated in inner compartment 42. Base 26 and cover 28 preferably snap together; however, any known engagement mechanism can used. Specifically, base 26 includes an inwardly extending projection 48 that is rounded to engage a curved snapping arm 50 that extends inwardly from cover 28, as seen in FIG. 5. Projection 48 can also extend from cover 28, and likewise snapping arm 50 can extend from base 26. Although pole body 24 is preferably formed with two pieces, base 26 and cover 28, body 24 can be formed as a unitary one-piece member.

Received in inner compartment 42 of pole body 24 is a barrier 52 dividing inner compartment 42 into first and second channels 54 and 56. Barrier 52 is preferably made of a low carbon steel to meet UL requirements, and extends generally the entire length of pole body 24. First channel 54 is defined between front wall 32 and barrier 52, and second channel 56 is defined between rear wall 34 and barrier 52. A gap (not shown) between the bottom of barrier 52 and the lower end of pole body 24 provides access for wiring 44 received in first channel 54 to second channel 56 and outlets 46 located on rear wall 34. Inwardly projecting first and second ears 58 and 60 releasably support barrier 52 in their respective slots 62 and 64, as seen in FIG. 5. Barrier 52 is a substantially planar member with a thickness slightly less than slots 62 and 64, so that barrier 52 closely fits into first and second ears 58 and 60. Preferably, first channel 54 receives any communication wiring of wiring 44, and second channel 56 receives any power wires from wiring 44, with barrier 52 providing a protective barrier between the wiring.

Each side wall 30 and 36 of elongated body 24 includes first and second securing elements 66 and 68, respectively, for engaging adjustment insert 100. Securing elements 66 and 68 are opposite one another and axially aligned, as seen in FIG. 5, and disposed near a terminal end 74 of pole body 24 remote from pole lower end 16. Preferably, securing elements 66 and 68 are apertures that receive first and second fasteners 70 and 72.

An end piece 76 is disposed on terminal end 74 and includes two side walls 78 and 80 with a back wall 82 extending therebetween forming a U-shape. Walls 78, 80, and 82 conform to the outer surface 38 of elongated body 24 and cover body side walls 30 and 36 and body rear wall 34. A cover wall 84 extends from walls 78, 80, and 82, and covers second channel 56 at terminal end 74. The top surface 86 of cover wall 84 supports a conduit fitting 88 thereon, as seen in FIGS. 1 and 4. Conduit fitting 88 holds two lengths of armored cable 90 connected to a power source (not shown), such as a junction box, bringing power via wiring 44 to outlet receptacles 46 in first or power channel 54.

Adjustment member 100 is a telescoping insert received in pole inner compartment 42, specifically in first channel 54, and generally includes first and second ends 101 and 102, a main wall 104, and first and second opposing end walls 106 and 108, as best seen in FIGS. 1–5. Insert 100 is preferably formed of aluminum or steel, but can be formed of any substantially rigid material, such as plastic. First and second ends 101 and 102 define a length therebetween which is about half the length of pole elongated body 24. Main wall 104 extends between end walls 106 and 108, and are substantially perpendicular to main wall 104. Main wall 104 and end walls 106 and 108 define an inner compartment 110 for receiving wiring 44. Extending from each end wall 106 and 108 are lip extensions 112 and 114, respectively, which facilitate management of wiring 44. However, lip extensions 112 and 114 are not necessary to the operation of adjustment insert 100.

A central longitudinal axis 116 of insert 100 is generally parallel to the longitudinal axis 92 of pole 10 as best seen in FIGS. 2 and 4. Insert 100 is slidably received in channel 54 creating a telescoping arrangement between pole 10 and insert 100. First end 101 of adjustment insert 100 includes a stop 118, such as a rivet, that prevents insert 100 from dropping entirely into pole inner compartment 42.

Main wall 104 is generally parallel to barrier 52 and proximate thereto, as seen in FIG. 5. Each end wall 106 and 108 is adjacent and generally parallel to pole side walls 30 and 36, respectively. Additionally, each end wall 106 and 108 includes first and second sets of securing interfaces 120 and 122, respectively, for engaging securing elements 66 and 68 of pole elongated body 24. Each of the first and second sets of securing interfaces 120 and 122 includes a plurality of aligned securing interfaces that are spaced from one another along end walls 106 and 108, respectively, as best seen in FIG. 1. First and second sets of securing interfaces 120 and 122 allow adjustment insert 100 to adjust to multiple positions by slidably moving insert 100 with respect to pole body 24. First and second sets of securing interfaces 120 and 122 coordinate with securing elements 66 and 68 of pole body 24 to adjust the height of pole 10. Specifically, by matching or corresponding the securing interfaces of first and second sets 120 and 122 with first and second securing elements 66 and 68 of pole body 24, and coupling the securing interfaces with first and second securing elements 66 and 68, the height of pole 10 can be adjusted to multiple positions.

For example, first set 120 includes at least first and second securing interfaces 124 and 126 with second securing interface 126 being aligned with and spaced from first securing interface 124, as best seen in FIGS. 1 and 4. Similarly, second set 122 includes at least third and fourth securing interfaces 128 and 130 with fourth securing interface 130 being aligned with and spaced from third securing interface 128. First securing interface 124, located on first end wall 106, is axially aligned with and opposite from third securing interface 128 located on second end wall 108, as best seen in FIG. 5. Likewise, second interface 126 located on first end wall 106 is axially aligned with and opposite from fourth securing interface 130 located on second end wall 108. In a first position of insert 100, first and third securing interfaces 124 and 128 match or correspond to first and second securing elements 66 and 68 of pole body 24. In a second position, second and fourth securing interfaces 126 and 130 correspond to first and second securing elements 66 and 68.

Preferably, securing interfaces 124, 126, 128, and 130 are each apertures which align with securing elements or apertures 66 and 68 of pole body 10 to receive first and second fasteners 70 and 72, respectively. However, the engagement of securing elements 66 and 68 and securing interfaces 124, 126, 128, and 130 can be any known engagement such as, a tab and slot, snapping, hooking, adhesive, or the like.

The terms first, second, third, and fourth, are used to facilitate description of the invention only and thus the first and second sets of securing interfaces 120 and 122 are not limited to two securing interfaces but can include more securing interfaces, depending on the amount of adjustability desired. Also, it is not required that each set of securing interfaces 120 and 122 include more than one securing interface. Rather, each set 120 and 122 can include only one securing interface providing only a single height adjustment of pole 10. Additionally, only one of first and second sets of securing interfaces 120 and 122 and one of first and second securing elements 66 and 68 is required to support insert 100 in the desired position.

Assembly and Operation of Embodiment of FIGS. 1–5

Assembly of adjustable pole 10 requires sliding adjustment insert 100 into inner compartment 42 of elongated pole body 24 along longitudinal axis 92. Specifically, insert 100 is inserted into first or communication channel 54 of pole body 24 with main wall 104 of insert 100 being parallel with and near barrier 52. Insert 100 is preferably inserted into communication channel 54 to meet UL requirements, but can be alternatively inserted into power channel 56.

Pole 10 can then be adjusted in height to match the ceiling surface 14. For example, in a first position where no adjustment is required, insert 100 is entirely received in communication channel 54 with first and third securing interfaces or apertures 124 and 128 aligning with first and second securing elements or apertures 66 and 68 of pole body 24. Fastener 70 can then be inserted into first aperture 124 of insert 100 and first aperture 66 of pole body 24. Likewise, fastener 72 can be inserted into third aperture 128 of insert 100 and second aperture 68 of pole body 24. Tightening fasteners 70 and 72 secures the insert 100 with respect to pole body 24 in this first position. As mentioned above, any type of known engagement or attachment can be used to secure insert 100 to pole body 24 rather than fasteners 70 and 72 including a tab and slot arrangement, a snapping arrangement, an adhesive arrangement, or the like.

To adjust pole 10 to another or second position where some adjustment in height is desired, insert 100 is slidably moved with respect to pole body 24 until second and fourth apertures 126 and 130 of insert 100 align with first and second apertures 66 and 68 of pole body 24. Fastener 70 can then be inserted into second aperture 126 of insert 100 and first aperture 66 of pole body 24. Likewise, fastener 72 can be inserted into fourth aperture 130 of insert 100 and second aperture 68 of pole body 24. Tightening fasteners 70 and 72 secures the insert 100 with respect to pole body 24 in this second position.

The amount of adjustment between the first and second positions is the distance between the first and second apertures 124 and 126 and likewise the distance between third and fourth apertures 128 and 130 of insert 100. Therefore, the distance or spacing between these apertures of each set 120 and 122 of insert 100 can be changed to provide different amounts of adjustment. Also, any number of apertures can be employed in each set 120 and 122 to provide a higher degree of adjustment. By aligning the apertures of insert 100 with first and second apertures 66 and 68 of pole body 24, the pole height can be adjusted to multiple positions. Moreover, main wall 104 of insert 100 maintains the barrier between the power and communication wires of wiring 44 necessary to meet UL requirements.

Once the appropriate height of pole 10 is selected and fasteners 70 and 72 secure insert 100 in the desire position, a portion of upper end 101 of insert 100 extends through ceiling 14 and secured thereto by clamp 13, as seen in FIG. 1. Also, foot 18 is anchored to the floor 20, thereby securing pole 10 between ceiling 14 and floor 20. Wiring 44 can be received in communication and power channels 54 and 56, respectively, of pole body 24 with communication wiring being received in communication channel 54 and power wiring being received in communication channel 56. The power wiring is electrical connected through conduit fitting 88 which is in turn connected to a junction box above ceiling 14. Similarly, communication wires are connected above ceiling 14 to the appropriate computer or other systems. Since outlets 46 are located closer to the lower end 16 of pole 10, outlets 46 are easily accessed.

Figure 6:
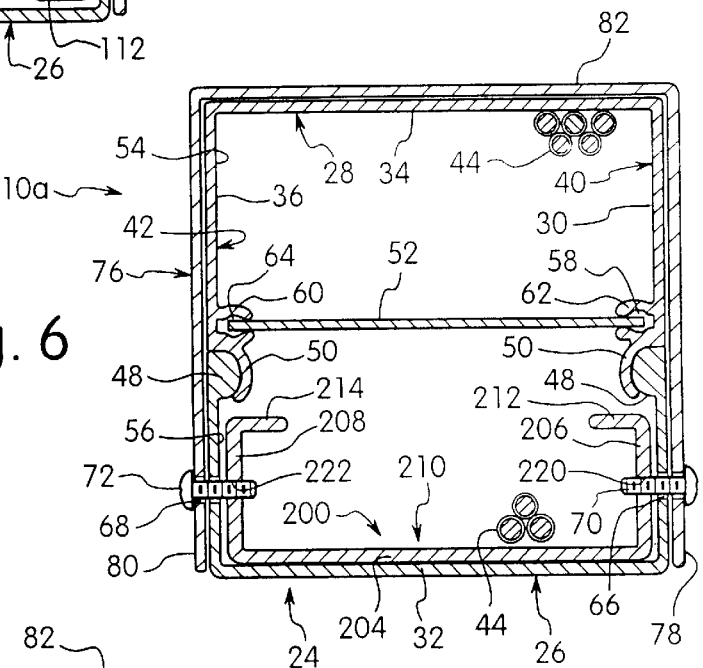
FIG. 6 is an enlarged, top plan view in section of an adjustable power pole in accordance with a second embodiment of the present invention.

Embodiment of FIG. 6

Referring to FIG. 6, a second embodiment of the present invention includes an adjustment insert 200 received in pole body 24 of power pole 10a. Insert 200 is similar to insert 100 of the first embodiment except for the main wall 204 of insert 200 is remote from pole barrier 52 rather than next to barrier 52.

As with insert 100, insert 200 is received in pole inner compartment 42, specifically in first or communication channel 54, and generally includes a main wall 204, and first and second opposing end walls 206 and 208. Main wall 204 extends between end walls 206 and 208, and is substantially perpendicular to walls 206 and 208. Main wall 204 and end walls 206 and 208 define an inner compartment 210 for receiving wiring 44. Extending from each end wall 206 and 208 are lip extensions 212 and 214, respectively, which facilitate management of wiring 44. However, lip extensions 212 and 214 are not necessary to the operation of adjustment insert 200.

Additionally, like insert 100, each end wall 206 and 208 includes first and second sets of securing interfaces or apertures 220 and 222, respectively, for engaging securing elements 66 and 68 of pole elongated body 24 to adjust power pole 10a. Each of the first and second sets of securing interfaces 220 and 222 includes a plurality of aligned securing interfaces or apertures that are spaced from one another along end walls 206 and 208, respectively.

Alternatively, a second main wall (not shown) can be included, which is parallel and remote from main wall 204 and extends between lip extensions 212 and 214, thereby forming an enclosed inner compartment.

Insert 200 is assembled with pole body 24 in the same manner as insert 100. In particular, once the apertures of first and second sets 220 and 222 disposed on end walls 206 and 208, are aligned with securing apertures 66 and 68 of pole body 24, fasteners 70 and 72 are inserted therein to secure insert 200 in the desired position, as described above with respect to insert 100. The assembly of pole body 24 and insert 200 can then be mounted to ceiling 14 and floor 20, and wiring 44 received in channels 54 and 56, in the same manner as described above.

Figure 7:
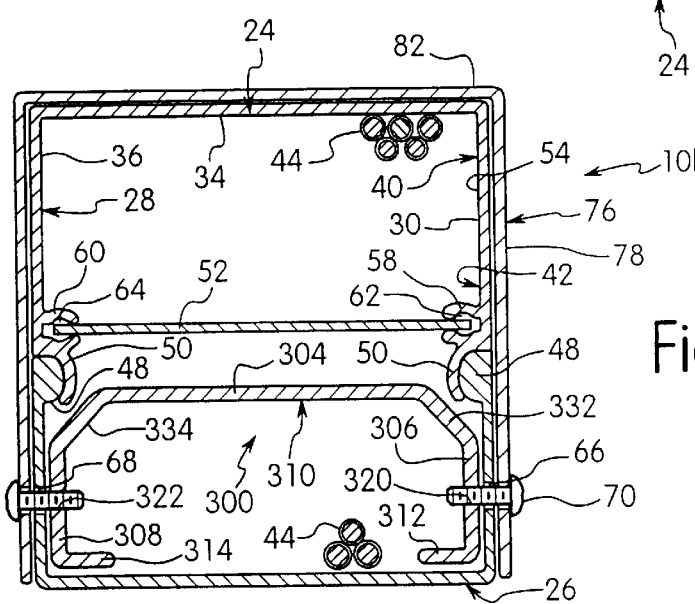
FIG. 7 is an enlarged, top plan view in section of an adjustable power pole in accordance with a third embodiment of the present invention.

Embodiment of FIG. 7

Referring to FIG. 7, a third embodiment of the present invention includes an adjustment insert 300 received in pole body 24 in power pole 10b. Insert 300 is similar to insert 100 of the first embodiment except for angled walls 332 and 334 are disposed between the main wall 304 of insert 300 and end walls 306 and 308, respectively, forming a generally U-shaped insert in cross section.

As with insert 100, insert 300 is received in pole inner compartment 42, specifically in first or communication channel 54, and generally includes a main wall 304 located near pole barrier 52, and first and second opposing end walls 306 and 308. Main wall 304 extends between angled walls 332 and 334, and each end wall 306 and 308 extends from each angled walls 332 and 334, respectively. Main wall 304, angled walls 332 and 334, and end walls 206 and 208 define an inner compartment 310 for receiving wiring 44. By forming insert 300 in this U-shaped fashion, the inner compartment 310 is slightly deeper and narrower than inner compartment 110 of insert 100. Extending from each end wall 306 and 308 are lip extensions 312 and 314, respectively, which facilitate management of wiring 44. However, lip extensions 312 and 314 are not necessary to the operation of adjustment insert 300.

Additionally, like insert 100, each end wall 306 and 308 includes first and second sets of securing interfaces or apertures 320 and 322, respectively, for engaging securing elements 66 and 68 of pole elongated body 24 to adjust power pole 10b. Each of the first and second sets of securing interfaces 320 and 322 includes a plurality of aligned securing interfaces or apertures that are spaced from one another along end walls 306 and 308, respectively.

Insert 300 is assembled with pole body 24 in the same manner as insert 100. In particular, once the apertures of first and second sets 320 and 322 disposed on end walls 306 and 308, are aligned with securing apertures 66 and 68 of pole body 24, fasteners 70 and 72 are inserted therein to secure insert 300 in the desired position, as described above with respect to insert 100. The assembly of pole body 24 and insert 300 can then be mounted to ceiling 14 and floor 20, and wiring 44 received in channels 54 and 56, in the same manner as described above.

Embodiment of FIGS. 8–11

Referring to FIGS. 8–11, an adjustable power pole 410 in accordance with a fourth embodiment of the present invention is similar to adjustable pole 10, and therefore only their distinctions will be described. In general pole 410 includes an elongated body 424 that receives an adjustment member or insert 500 that allows pole 410 to be adjusted to any ceiling height. Pole 410 is mounted to ceiling 14 and floor 20 in the same manner as described above for pole 10.

Figure 8:
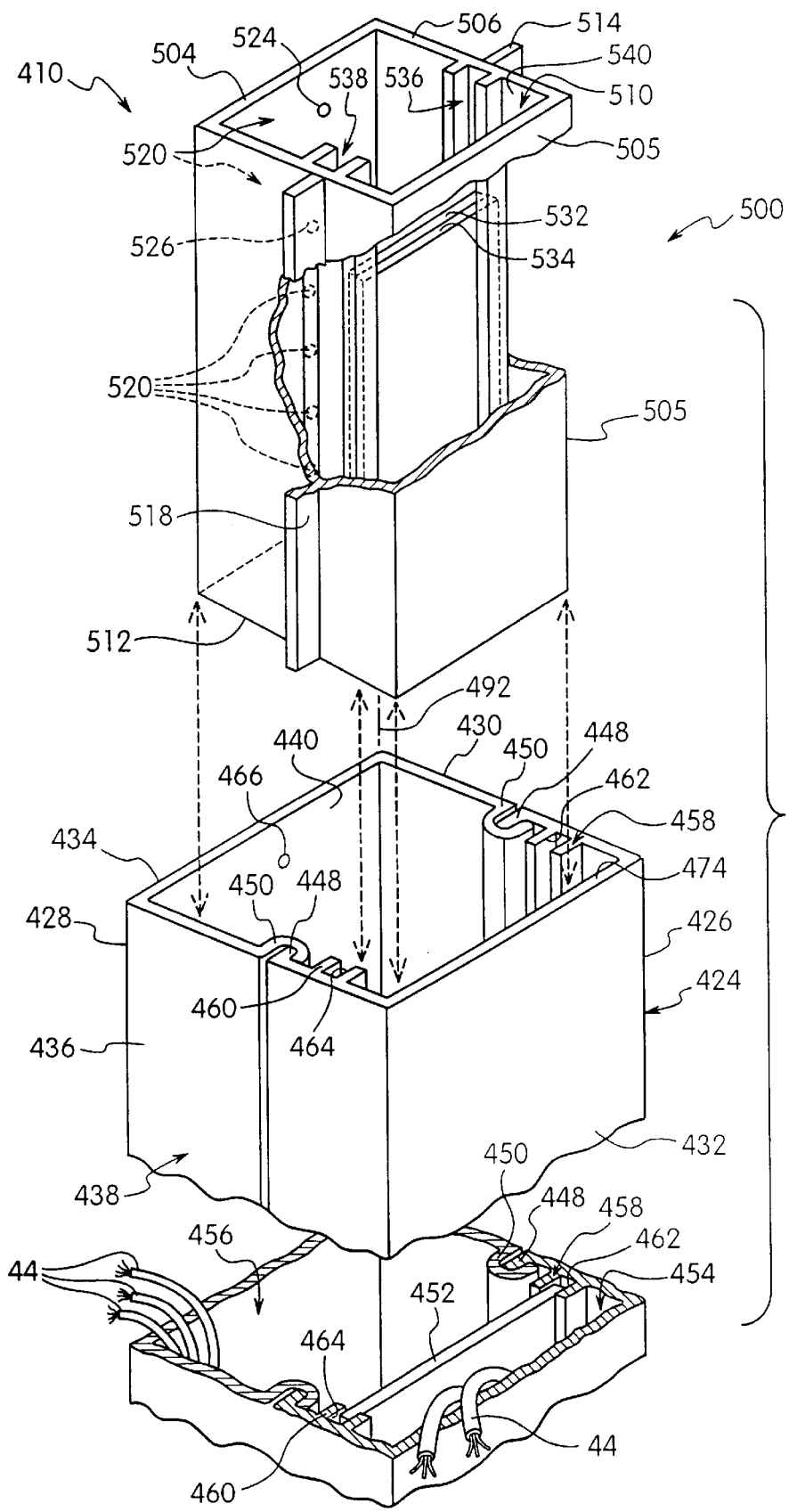
FIG. 8 is an enlarged, exploded, perspective view of an adjustable power pole in accordance with a fourth embodiment of the present invention, showing an adjustment member being inserted into a pole body.

As with pole 10, pole 410 of the fourth embodiment includes an elongated body 424 formed by engagement of a base and a cover 426 and 428, thereby defining side walls 430 and 436 and front and rear walls 432 and 434. Base 426 and cover 428 snap together with an inwardly extending projection 448 that engages a curved snapping arm 450, as seen in FIG. 8.

Pole body 424 has an outer surface 438 and an inner surface 440 that defines an inner compartment 442 extending through the length of elongated body 424. As with pole 10 of the first embodiment of FIGS. 1–5, inner compartment 442 of pole 410 receives electrical wiring 44 for providing power and communications to pole 410. Outlet receptacles (not shown) similar to outlets 46 of the first embodiment are provided on rear wall 434 and are connected to power and communications wiring 44.

Figure 9:
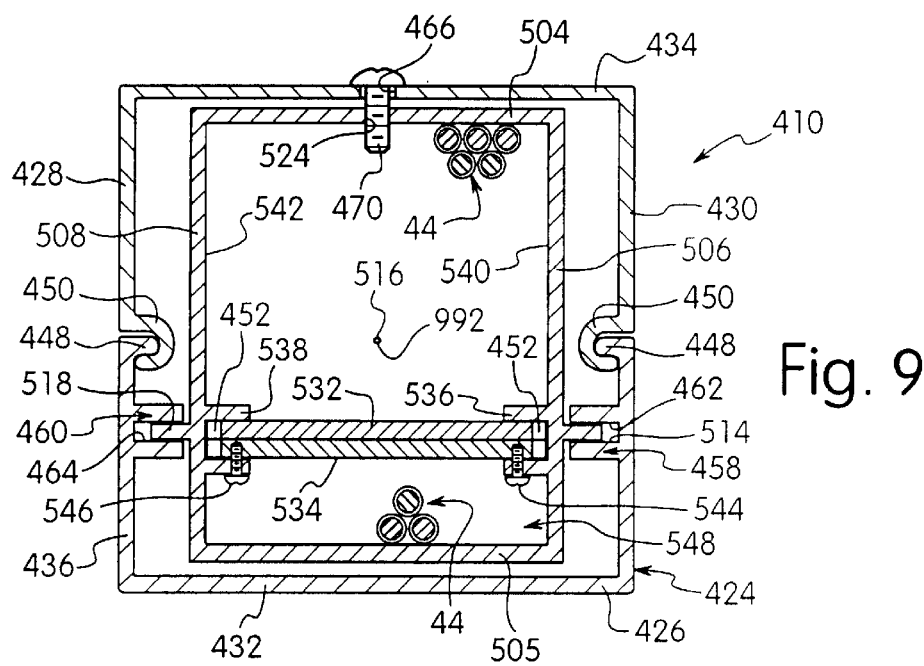
FIG. 9 is an enlarged, top plan view in section of the adjustable power pole illustrated in FIG. 8, showing the assembly of the adjustment member and pole body.

Received in inner compartment 442 of pole body 424 is a barrier 452 dividing inner compartment 442 into first and second channels 454 and 456. Unlike barrier 52 of the first embodiment, barrier 452 does not extend the entire length of pole body 424 but rather only extends for about half the length of pole body 424. Inwardly projecting first and second ears 458 and 460 releasably support barrier 452 in their respective slots 462 and 464, as seen in FIG. 9. Barrier 452 is a substantially planar member with a thickness slightly less than slots 462 and 464, so that barrier 452 closely fits into first and second ears 458 and 460. Also, first channel 454 is defined between front wall 432 and barrier 452 and second channel 456 is defined between rear wall 434 and barrier 452. Preferably, first channel 454 receives any communication wiring of wiring 44, and second channel 456 receives any power wiring from 44, with barrier 452 providing a protective barrier between the wires. Although first or communication channel 454 is shown as being smaller than second or power channel 456, first channel 454 can be the same size or larger than the second channel 456.

Pole body 424 includes a securing element 466 for engaging adjustment insert 500. Securing element 466 can be located on any wall of pole body 424 and therefore does not have to be located on rear wall 434. Also, a second securing element (not shown) can be located on any of the pole body walls to provide additional securement of insert 500. Securing element 466 is disposed near a terminal end 474 of pole body 424 remote from the lower end of pole 410. Preferably, securing element 466 is an aperture that receives a fastener 470.

Adjustment insert 500 is received in pole inner compartment 442, and generally includes first and second main walls 504 and 505, and first and second opposing end walls 506 and 508, as best seen in FIG. 9. Insert 500 has a length that is about half the length of pole elongated body 424 so that insert 500 can be fully received in inner compartment 442 of pole body 424. Main walls 504 and 505 extend between end walls 506 and 508, and are substantially perpendicular thereto. Main walls 504 and 505 and end walls 506 and 508 define an inner compartment 510 for receiving wiring 44.

A central longitudinal axis 516 of insert 500 is generally coaxial with a central longitudinal axis 492 of pole 410. Insert 500 is slidably received in inner compartment 442 creating a telescoping arrangement between pole 410 and insert 500. Barrier 452 prevents insert 500 from dropping to the lower end of pole 410.

Main walls 504 and 505 are generally adjacent and parallel to pole rear and front walls 434 and 432, respectively. Each end wall 506 and 508 is generally parallel to pole side walls 430 and 436, respectively, and spaced therefrom by ears 458 and 460. Extensions 514 and 518 extend outwardly from end walls 506 and 508, respectively, for engaging ears 458 and 460 of pole body 424. Extensions 514 and 516 extend substantially the length of insert 500. Additionally, first main wall 504 includes a set of securing interfaces 520 for engaging securing element 466 of pole elongated body 424. The set of securing interfaces 520 includes a plurality of aligned securing interfaces that are spaced from one another along main wall 504, as seen in FIG. 8. As with the first embodiment, the set of securing interfaces 520 allows adjustment insert 500 to adjust to multiple positions by slidably moving insert 500 with respect to pole body 424. The set of securing interfaces 520 coordinates with securing element 66 of pole body 424 as insert 500 slides, to adjust the height of pole 10.

For example, set 520 includes at least first and second securing interfaces 524 and 526 with second securing interface 526 being aligned with and spaced from first securing interface 524, as best seen in FIG. 8. In a first position of insert 500, first securing interfaces 524 matches or corresponds to securing element 466 of pole body 424. In a second position, second securing interface 426 corresponds to, i.e. aligns with, securing element 466.

Preferably, securing interfaces of set 520, including first and second securing interfaces 524 and 526, align with securing element or aperture 466 of pole body 424 as insert 500 slides and receives fastener 470 when the desired position is reached. However, the engagement of securing element 466 and the securing interfaces of set 520 can be any known engagement such as, a tab and slot, snapping, hooking, adhesive, or the like. Also, the set of securing interfaces or apertures 520 can be located on any wall of insert 500 as long as the apertures align with the securing aperture 466 of pole body 424.

As with pole 10 of the first embodiment, the terms first and second are used to facilitate description of the invention only and thus the set of securing interfaces 520 is not limited to two securing interfaces but can include more securing interfaces, depending on the amount of adjustability desired. Also, it is not required that the set of securing interfaces 520 include more than one securing interface. Rather, set 520 can include only one securing interface providing only a single height adjustment of pole 410. Additionally, a second set of securing interfaces can be added to any wall of insert 500 as long as the second set of securing interfaces corresponds to a securing element of pole body 424.

Within inner compartment 510 of insert 500 are second and third barriers 532 and 534 which extend substantially the length of insert 500. Barrier 532 and 534 are substantially planar and have generally the same thickness as first barrier 452 of pole body 424. Barriers 532 and 534 are supported by first and second inwardly extending guide tracks 536 and 538 disposed on the inner surfaces 540 and 542 of end walls 506 and 508, respectively. Each track 536 and 538 extends the length of insert 500 and are substantially aligned with ears 458 and 460 of pole body 424. Also, each track 536 and 538 has sufficient width to accommodate both barriers 532 and 534.

Second barrier 532 is slidably received and separate from tracks 536 and 538, thereby allowing barrier 532 to slide with respect to insert 500. Second barrier 532 is located in tracks 536 and 538 so that second barrier 532 is generally aligned with first barrier 452 of pole body 424. Third barrier 534 is releasably coupled to tracks 536 and 538 so that when moving insert 500, third barrier 534 will also move. Specifically, fasteners 544 and 546 can be used to couple barrier 534 to each track 536 and 538, respectively, as best seen in FIG. 9. However, any known attachment can be used to couple barrier 534 to tracks 536 and 538, such as a snap attachment, an adhesive attachment, or the like.

Barrier 534 and 536 form first and second channels 548 and 550 within inner compartment 510 of insert 500. First and second channels 548 and 550 align with and are substantially continuous with first and second channels 454 and 456 of pole body 424. Like channels 454 of 456 of pole body 424, channels 548 and 550 can be larger or smaller than each other, or they can be the same size as long as channels 548 and 550 generally align with channels 454 and 456.

Assembly and Operation of Embodiment of FIGS. 8–11

Pole 410 is assembled in substantially the same manner as pole 10 of the first embodiment of FIGS. 1–5. Specifically, adjustment insert 500 is inserted into inner compartment 442 of elongated pole body 24 with extensions 514 and 518 of insert 500 engaging ears 458 and 460 of pole body 424, respectively, until the end 512 of insert walls 504, 505, 506, and 508 abuts barrier 452. Second barrier 536 of insert 500 also aligns with barrier 452.

Figure 10:
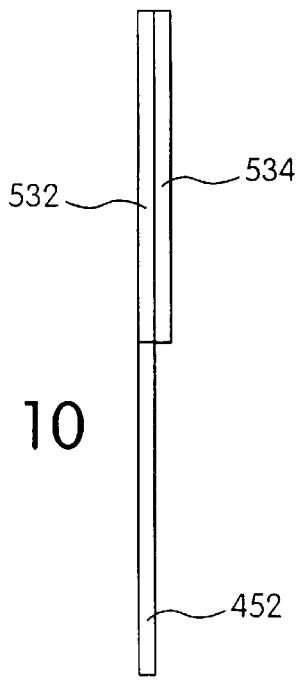
FIG. 10 is a side, elevational view of the barriers illustrated in FIG. 8, showing the barriers in a non-adjusted position.

Pole 410 can then be adjusted in height. For example, in a first position where no adjustment is required, insert 500 is entirely received in inner compartment 442 of pole body 424 with first securing interface or aperture 524 aligning with securing element or aperture 466 of pole body 24. Fastener 470 can then be inserted into aperture 524 of insert 500 and aperture 466 of pole body 424. Tightening fasteners 470 secures the insert 500 with respect to pole body 424 in this first position. In this position, barriers 532 and 534 of insert 500 are generally side by side with a substantial portion of barrier 534 being adjacent barrier 532, as best seen in FIG. 10.

Figure 11:
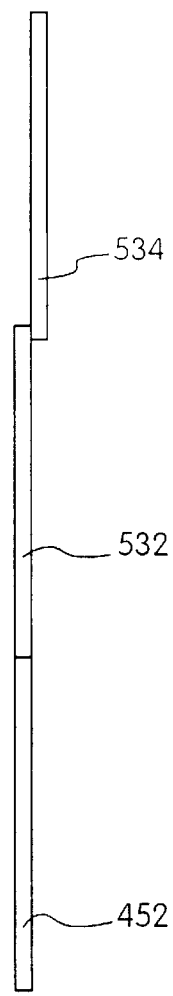
FIG. 11 is a side, elevational view of barriers of the adjustable pole illustrated in FIG. 10, showing the barriers in an adjusted position.

To adjust pole 410 to another or second position where adjustment in height is required, insert 500 is slidably moved with respect to pole body 424 until second aperture 526 of insert 500 aligns with aperture 466 of pole body 424. Since barrier 532 of insert 500 is not coupled to insert 500, barrier 532 will remain in its position aligned with barrier 452 of pole body 424 with insert 500 sliding with respect to barrier 532. Barrier 534, however, will move with insert 500 to the second position, as best seen in FIG. 11, since barrier 534 is coupled to insert 500. In this position, barrier 534 is off-set from barrier 532 thereby maintaining the barrier between first and second channels 548 and 550 of insert 500 as necessary under UL requirements. Fastener 470 can then be inserted into second aperture 526 of insert 500 and aperture 466 of pole body 424. Tightening fastener 470 secures the insert 500 with respect to pole body 424 in this second position. Additional slidable barriers can be added to insert 500 to provide more adjustment in height of pole 410.

As with insert 100 of the first embodiment, any number of apertures can be employed with insert 500 to provide a higher degree of adjustment. By aligning the apertures of insert 500 with aperture 466 of pole body 424, as insert 500 slides with respect to body 424, the pole height can be adjusted to multiple positions.

Once the appropriate height of pole 410 is selected and fastener 470 secures insert 500 in the desired position, pole 410 is mounted to ceiling 14 and floor 20 in the same manner as described above for pole 10. Wiring 44 can be received in communication and power channels 454 and 456 of pole body 424, respectively, and first and second channels 548 and 550 of insert 500, respectively, with communication wiring being received in channels 454 and 548 and power wiring being received in channels 456 and 550. As with pole 10, the outlets are located closer to the lower end of pole 410, to provide easy access thereto.

Figure 12:
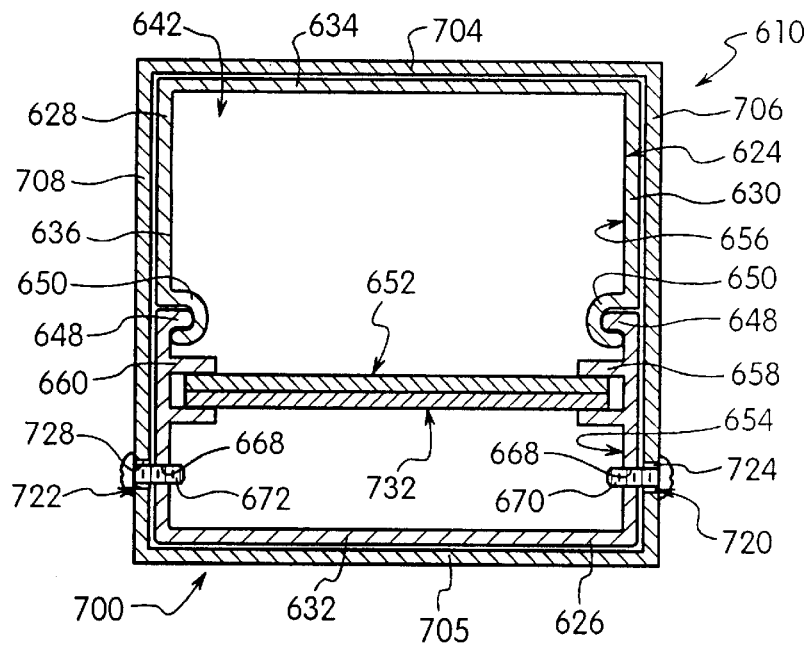
FIG. 12 is an enlarged, top plan view in section of the adjustable power pole in accordance with a fifth embodiment of the present invention.
Figure 13:
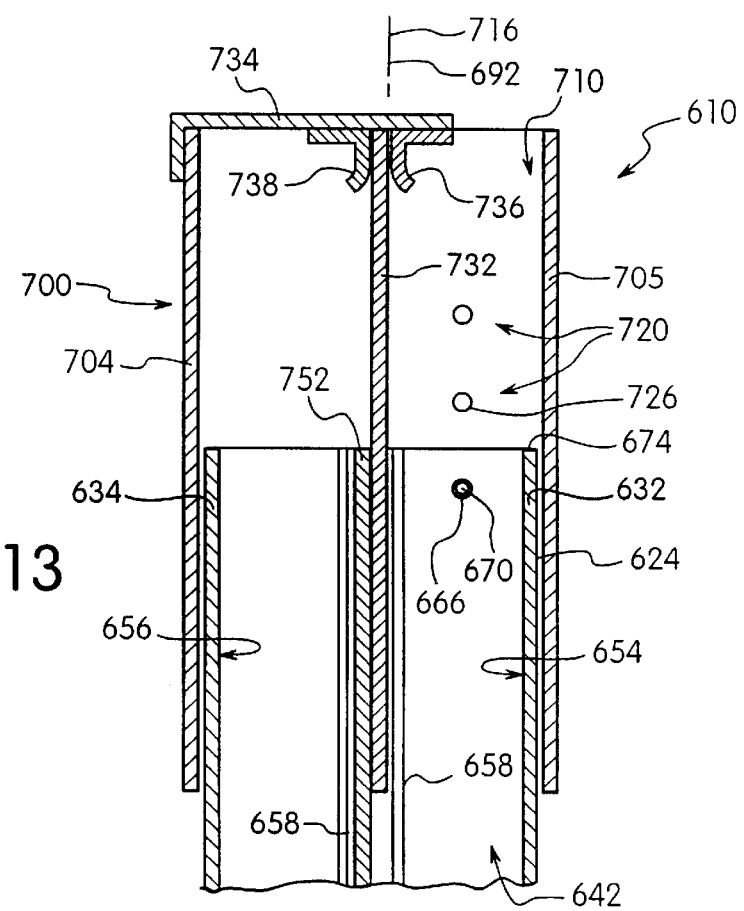
FIG. 13 is a side, elevational view of the adjustable power pole illustrated in FIG. 12, showing an adjustment member in an adjusted position.

Embodiment of FIGS. 12–13

Referring to FIGS. 12–13, an adjustable power pole 610 in accordance with a fifth embodiment of the present invention is similar to adjustable pole 410, and therefore only their distinctions will be described. In general pole 610 includes an elongated body 624 that receives an adjustment member 700 that allows pole 610 to be adjusted to any ceiling height.

As with pole 410, pole 610 of the fifth embodiment includes an elongated body 624 formed by engagement of a base and a cover 626 and 628, thereby defining side walls 630 and 636 and front and rear walls 632 and 634. Base 626 and cover 628 snap together with an inwardly extending projection 648 that engages a curved snapping arm 650, as seen in FIG. 12.

Pole body 624 has an inner compartment 642 extending through the length of elongated body 624. As with pole 410, inner compartment 642 of pole 610 receives wiring 44 for providing power and communications to pole 610. Outlet receptacles (not shown) similar to outlets 46 of the first embodiment are provided on rear wall 634 and are connected to power and communications wiring 44.

Received in inner compartment 642 of pole body 624 is a first barrier 652 dividing inner compartment 642 into first and second channels 654 and 656. Barrier 652 extends substantially the entire length of pole body 624. Inwardly projecting first and second ears 658 and 660 releasably support barrier 652, as seen in FIG. 12. First channel 654 is defined between front wall 632 and barrier 652 and second channel 656 is defined between rear wall 634 and barrier 652. Preferably, first channel 654 receives any communication wiring of wiring 44, and second channel 656 receives any power wiring from wiring 44, with barrier 652 providing a protective barrier between the wires. Although first or communication channel 654 is shown as being smaller than second or power channel 656, first channel 654 can be the same size or larger than the second channel 656.

Pole body 624 includes first and second securing elements 666 and 668 for engaging adjustment member 700. Securing elements 666 and 668 are preferably located on side walls 630 and 636 of pole body 624. Securing elements 666 and 668 are disposed near a terminal end 674 of pole body 624 remote from the lower end of pole 610. Preferably, securing elements 666 and 668 are apertures that receive fasteners 670 and 672.

Adjustment member 700 slides over pole body 624 and generally includes first and second main walls 704 and 705, and first and second opposing end walls 706 and 708, as best seen in FIG. 12. Member 700 has a length that is about half the length of pole elongated body 624. Main walls 704 and 705 extend between end walls 706 and 708, and are substantially perpendicular thereto. Main walls 704 and 705 and end walls 706 and 708 define an inner compartment 710 for receiving pole body 624 and wiring 44. A central longitudinal axis 716 of member 700 is generally coaxial with a central longitudinal axis 692 of pole 610. Member 700 slides over pole body 624 creating a telescoping arrangement between pole 610 and member 700. Although four walls 704, 705, 706, and 708 are shown and described, member 700 can include only three walls. In particular, wall 704 nest to power channel 656 is preferably removed to avoid any interference with outlets disposed on rear wall 634 of pole body 624.

Main walls 704 and 705 are generally adjacent and parallel to pole rear and front walls 634 and 632, respectively. Each end wall 706 and 708 is generally parallel to pole side walls 630 and 636. End walls 706 and 708 include a first set of securing interfaces 720 and a second set of serving interfaces 722 for engaging securing elements 666 and 668 of pole elongated body 624, respectively. Each set of securing interfaces 720 and 722 includes a plurality of aligned securing interfaces that are spaced from one another along walls 706 and 708, as best seen in FIG. 13 (showing set 720 only). As with the first embodiment, the sets of securing interfaces 720 and 722 allow adjustment member 700 to adjust to multiple positions by slidably moving member 700 with respect to pole body 624. The securing interfaces of sets 720 and 722 coordinate with securing elements 666 and 668 of pole body 624 as member 700 slides, to adjust the height of pole 610.

For example, set 720 includes at least a first interface 724 and a second securing interface 726 with second securing interface 726 being aligned with and spaced from first securing interface 724, similar to first and second securing interfaces 124 and 126 of the first embodiment. Also, second set 722 includes a third securing interface 728 and a fourth interface (not shown) spaced from third interface 728. In a first position of member 700, first and third securing interfaces 724 and 728 match or correspond to securing elements 666 and 668 of pole body 624, as seen in FIG. 12. In a second position, the second and fourth securing interfaces correspond to, i.e. align with, securing elements 666 and 668. Fasteners 670 and 672 can be inserted to support member 700 in the first and second positions, in the same manner as the first through fourth embodiments. Also, second set 722 is not necessary to secure member 700 to pole body 624 and thus can be eliminated.

To maintain a barrier between communication wires and power wires when member 700 is moved between adjustment positions, a second barrier 732 is coupled to member 700 as best seen in FIG. 13. Specifically, second barrier 732 is coupled to a bracket 734 of member 700 by guides 736 and 738 which frictionally hold barrier 732. In addition, a fastener (not shown) can be inserted through a side wall of member 700 near its upper end that also engages second barrier 732, thereby securing barrier 732 to member 700. Ears 658 and 660 of pole body 624 are wide enough to accommodate both first and second barriers 652 and 732 as best seen in FIG. 13 (showing ear 658 only).

As member 17 slides to an adjusted position with respect to pole body 624, second barrier 732 slides with respect to first barrier 652 and ears 658 and 660. This maintains a barrier between communication channel 654 and power channel 656 when pole 610 is in an adjusted position.

Assembly and Operation of Embodiment of FIGS. 12–13

Pole 610 is assembled by sliding member 700 over elongated pole body 624 so that body 624 is received in a substantial portion of inner compartment 710 of member 700. Pole 610 can then be adjusted in height. For example, in a first position where no adjustment is required, pole body 624 is received in a substantial portion of inner compartment 710 of member 700 with first and third securing interfaces or apertures 724 and 728 aligning with securing elements or apertures 666 and 668 of pole body 624. Fasteners 670 and 672 can then be inserted into apertures 724 and 728 and apertures 666 and 668 of pole body 624. Tightening fasteners 670 and 672 secures member 700 with respect to pole body 624 in this first position. In this position, barriers 652 and 732 are generally side by side with a substantial portion of barrier 7342 being adjacent barrier 652.

To adjust pole 610 to another or second position where adjustment in height is required, member 700 is slidably moved with respect to pole body 624 until the second and fourth aperture of member 700 align with apertures 666 and 668 of pole body 624. Barrier 732 will move with member 700 to the second position, as best seen in FIG. 13, since barrier 732 is coupled to member 700. In this position, barrier 732 is off-set from barrier 652 thereby maintaining the barrier between first and second channels 654 and 656 of pole body 624 as necessary under UL requirements. Fasteners 670 and 672 can then be inserted into the second and fourth apertures and apertures 666 and 668 of pole body 624. Tightening fasteners 670 and 672 secures the member 700 with respect to pole body 624 in this second position. Additional slidable barriers can be added to member 700 to provide more adjustment in height.

As with the first through fourth embodiments, any number of apertures can be employed with member 700 to provide a higher degree of adjustment. By aligning the apertures of member 700 with apertures 666 and 668 of pole body 624, as member 700 slides with respect to body 624, the pole height can be adjusted to multiple positions.

While particular embodiments have been chosen to illustrate the invention, it will be understood by those skilled in the art that various changes and modifications can be made therein without departing from the scope of the invention as defined in the appended claims.

What is claimed is:

1. A pole for supplying power and communications, comprising:

an elongated body including a wall, said wall defining an inner compartment receiving power and communications wiring therein, and said wall having a securing element, and a longitudinal axis;

a barrier member supported by said elongated body, said barrier member defining first and second channels within said inner compartment said first and second channels receiving the power and communications wiring; and an adjustment member slidably received in said inner compartment of said elongated body, said adjustment member defining a longitudinal axis, said longitudinal axis of said adjustment member being substantially parallel to said longitudinal axis of said wall of said elongated body, and said adjustment member having a first securing interface corresponding to said securing element of said wall of said elongated body when said adjustment member is in a first position with respect to said elongated body.

2. A pole according to claim 1, wherein
said adjustment member includes a second securing interface that corresponds to said securing element of said elongated body when said adjustment member is in a second position with respect to said elongated body.

3. A pole according to claim 2, wherein
said second securing interface is aligned with and spaced from said first securing interface, whereby said adjustment member slidably moves between said first and second positions.

4. A pole according to claim 3, wherein
said securing element of said elongated body is a first aperture;
said first securing interface of said adjustment member is a second aperture; and
a fastener extends through said first aperture and said second aperture when said adjustment member is in said first position.

5. A pole according to claim 3, wherein
said securing element of said elongated body is a first aperture;
said second securing interface of said adjustment member is a third aperture; and
a fastener extends through said first aperture and said third aperture when said adjustment member is in said second position.

6. A pole according to claim 1, wherein
said adjustment member includes a main wall and an end wall, said main wall is substantially perpendicular to said wall of said elongated body, and said end wall is substantially parallel to said wall of said elongated body, and said first securing interface is located on said end wall.

7. A pole according to claim 1, wherein
said securing element of said elongated body is a first securing element;
said elongated body includes a second securing element opposite said first securing element; and
said adjustment member includes a second securing interface aligned with said first securing interface and a third securing interface that opposes said first securing interface and that corresponds to said second securing element of said elongated body.

8. A pole according to claim 7, wherein said adjustment member includes a main wall and first and second end walls, said main wall is substantially perpendicular to said wall of said elongated body, each of said first and second end walls is substantially parallel to said wall of said elongated body, and said first and second securing interfaces are located on said first end wall, and said third securing interface is located on said second end wall.

9. A pole according to claim 1, wherein said securing element of said elongated body is a first aperture;

said first securing interface of said adjustment member is a second aperture; and a fastener extends through each of said first and second apertures, thereby supporting said adjustment member in said first position.

10. A pole according to claim 1, wherein said adjustment member includes a main wall and an end wall, said main wall is substantially perpendicular to said wall of said elongated body, and said end wall is substantially parallel to said wall of said elongated body; and said adjustment member is received in said first channel and supports the power and communications wiring disposed in said first channel.

11. A pole according to claim 10, wherein said adjustment member is substantially C-shaped with said main wall located remote from said barrier member.

12. A pole according to claim 10, wherein said adjustment member is substantially C-shaped with said main wall is located proximate said barrier member.

13. A pole according to claim 12, wherein said adjustment member is substantially U-shaped.

14. A pole according to claim 1, wherein said wall of said elongated body is a first wall;

said elongated body includes second and third walls with said first wall extending between said first and second walls;

said second wall includes a first outlet connected to the power and communications wiring in said first channel; and said third wall includes a second outlet connected to the power and communications wiring in said second channel.

15. A pole according to claim 1, wherein said wall of said elongated body includes first and second opposite surfaces; and said barrier member extends from said first surface to said second surface.

16. A pole for supplying power and communications, comprising:

an elongated body including a wall, said wall defining a first inner compartment receiving power and communications wiring, a securing element located on said wall, and a first barrier member defining first and second channels within said first inner compartment and said first and second channels receiving the power and communications wiring; and an adjustment member slidably received in said first inner compartment of said elongated body, and having a main wall and an end wall forming a second inner compartment, said second compartment being substantially co-axial with said first compartment of said elongated body, and a first securing interface corresponding to said securing element of said wall of said elongated body when said adjustment member is in a first position with respect to said elongated body.

17. A pole according to claim 16, wherein a separate second barrier member is slidably received in said second inner compartment of said adjustment member, and is substantially aligned with said first barrier member.

18. A pole according to claim 17, wherein said second barrier member defines first and second channels within said second inner compartment of said adjustment member; and said first and second channels of said adjustment member are substantially aligned with said first and second channels, respectively, of said elongated body.

19. A pole according to claim 17, wherein a third barrier member is received in said second inner compartment of said adjustment member, said third barrier member being releasably coupled to said adjustment member with a substantial portion of said third barrier member being adjacent to said second barrier member when said adjustment member is in said first position.

20. A pole according to claim 17, wherein a third barrier member is received in said second inner compartment of said adjustment member, said third barrier member being releasably coupled to said adjustment member with at least a portion of said third barrier member being spaced from said second barrier member when said adjustment member is in a second position.

21. A pole according to claim 19, wherein said adjustment member and said third barrier member are slidable with respect to both said elongated body and said second barrier member, allowing said adjustment member to move between said first and second positions.

22. A pole according to claim 16, wherein said securing element of said elongated body is a first aperture;

said first securing interface of said adjustment member is a second aperture; and a fastener extends through each of said first and second apertures, thereby supporting said adjustment member in said first position.

23. A pole according to claim 16, wherein said adjustment member includes a second securing interface aligned with and spaced from said first securing interface;

said second securing interface corresponds to said securing element of said elongated body when said adjustment member is in a second position; and said adjustment member slidably moves between said first and second positions.

24. A pole according to claim 23, wherein said securing element of said elongated body is a first aperture;

said second securing interface of said adjustment member is a second aperture; and a fastener extends through each of said first and second apertures, thereby supporting said adjustment member in said second position.

25. A pole according to claim 16, wherein said elongated body includes a guide track located on an inner surface of said elongated member;

said adjustment member includes an extension extending from an outer surface of said adjustment member; and said extension is received in said guide track.

26. A pole according to claim 16, wherein said elongated body has a cross-sectional shape;

said adjustment member has a cross-sectional shape that substantially conforms to said cross-sectional shape of said elongated body.

27. A pole for supplying power and communications, comprising:

an elongated body including a wall, said wall defining an inner compartment receiving power and communications wiring therein, and said wall having a securing element, and a longitudinal axis;

a barrier member supported by said elongated body, said barrier member defining first and second channels within said inner compartment, said first and second channels receiving the power and communications wiring; and an adjustment member slidably coupled with said elongated body and coupled with a portion of said barrier member, said adjustment member having a portion defining a longitudinal axis, said longitudinal axis of said adjustment member being substantially parallel to said longitudinal axis of said wall of said elongated body, and said adjustment member having a first securing interface corresponding to said securing element of said wall of said elongated body when said adjustment member is in a first position with respect to said elongated body.

28. A pole according to claim 27, wherein said adjustment member includes an inner compartment; and said elongated body is received in said inner compartment of said adjustment member.

29. A pole according to claim 28, wherein said adjustment member includes a second securing interface that corresponds to said securing element of said elongated body when said adjustment member is in a second position with respect to said elongated body.

30. A pole according to claim 28, wherein said adjustment member includes a first wall that is substantially parallel to and adjacent said wall of said elongated body.

31. A pole according to claim 30, wherein said adjustment member includes a second wall remote from said first wall and a third wall extending between said first and second walls, said first, second, and third walls forming said inner compartment of said adjustment member.

32. A pole according to claim 31, wherein said adjustment member includes a fourth wall remote from said third wall and extending between said first and second walls.

33. A pole according to claim 27, wherein a bracket member of said adjustment member is coupled to said portion of said barrier member; and said bracket member is substantially perpendicular to said wall of said elongated member.

34. A pole according to claim 33, wherein said bracket member of said adjustment member is frictionally engaged with said portion of said barrier member.

35. A pole according to claim 27, wherein said barrier member includes first and second slidable portions; and said adjustment member is coupled to said first portion.

* * * * *